United States Patent [19]

Dowd

[11] 3,866,836
[45] Feb. 18, 1975

[54] SELF PROPELLED IRRIGATION SYSTEM WITH CLUTCH

[76] Inventor: Leo J. Dowd, 117 S. Parkway, Columbus, Nebr.

[22] Filed: June 17, 1974

[21] Appl. No.: 479,860

[52] U.S. Cl................. 239/177, 239/212, 137/344
[51] Int. Cl. ...... B05b 3/12, B60p 3/30, A01m 7/00
[58] Field of Search.................... 239/172, 177, 212; 137/344; 222/178; 180/10; 280/255

[56] References Cited
UNITED STATES PATENTS

| | | | |
|---|---|---|---|
| 2,893,643 | 7/1959 | Gordon | 239/177 X |
| 3,353,750 | 11/1967 | Dowd | 137/344 X |
| 3,373,939 | 3/1968 | Dowd | 137/344 X |
| 3,606,161 | 9/1971 | Paul | 137/344 X |

*Primary Examiner*—Robert S. Ward, Jr.
*Attorney, Agent, or Firm*—Molinare, Allegretti, Newitt & Witcoff

[57] ABSTRACT

An irrigation system of the type which includes an above-ground, moving elongated water distribution pipe. The pipe is pivotally supported at one end and a plurality of spaced movable support members support the pipe between the pivoted end and the opposite or outer end. The invention includes an improved clutch connected to an arm which is pivotally supported by each of the support members. A reciprocal drive cable imparts pivoting movement to the arm. Wheels are mounted on each of the support members for moving each support, and thereby the entire irrigation system along the ground. A drive assembly is mounted on each support and imparts rotation to the wheels. A control cable is pulled taut when one of the support members lags behind the other support members and becomes loose when one of the supports moves ahead of the other support members. The clutch, connected to the arm, has an operative or engaged position when the control cable is in the taut condition so as to transmit driving motion from the pivoted arm to the drive mechanism and it has an inoperative or disengaged position when the control cable is in the loose condition so as to stop transmission of motion from the arm to the wheel drive assembly.

12 Claims, 10 Drawing Figures

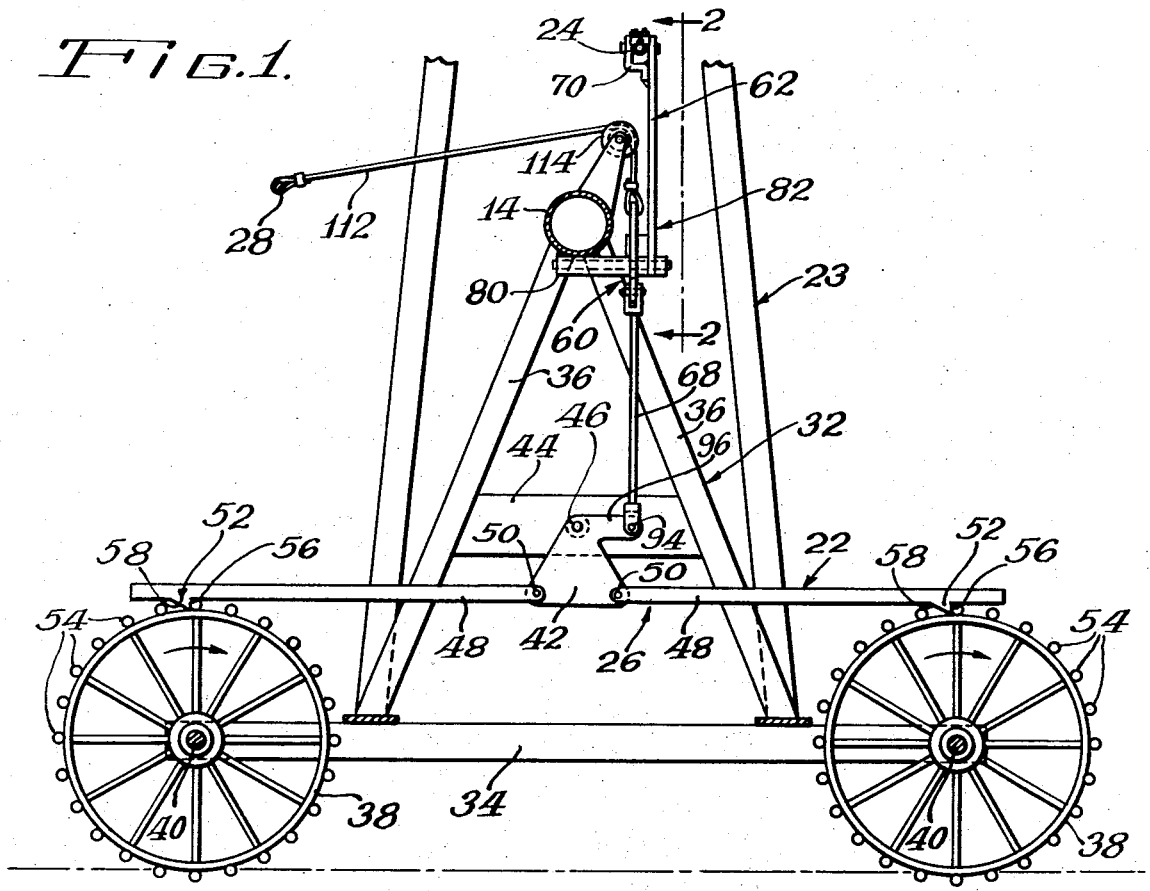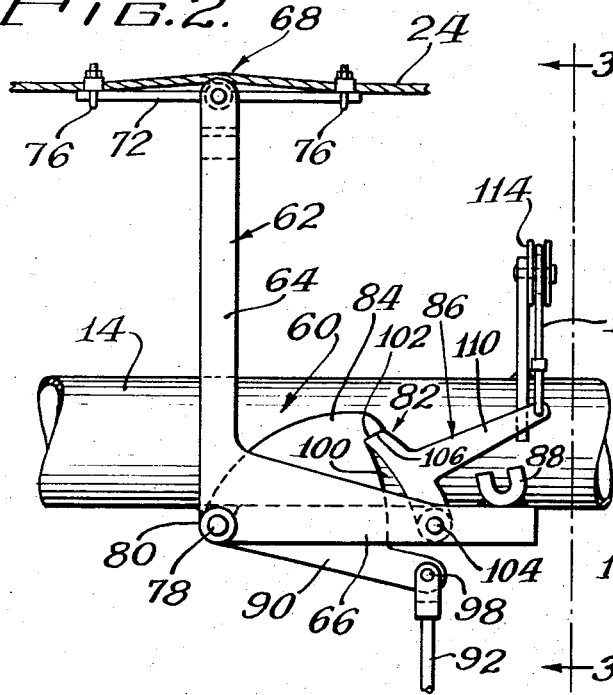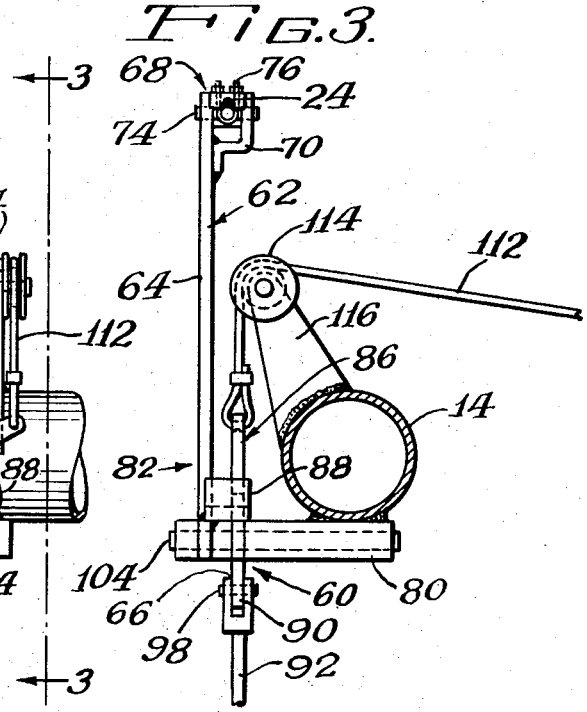

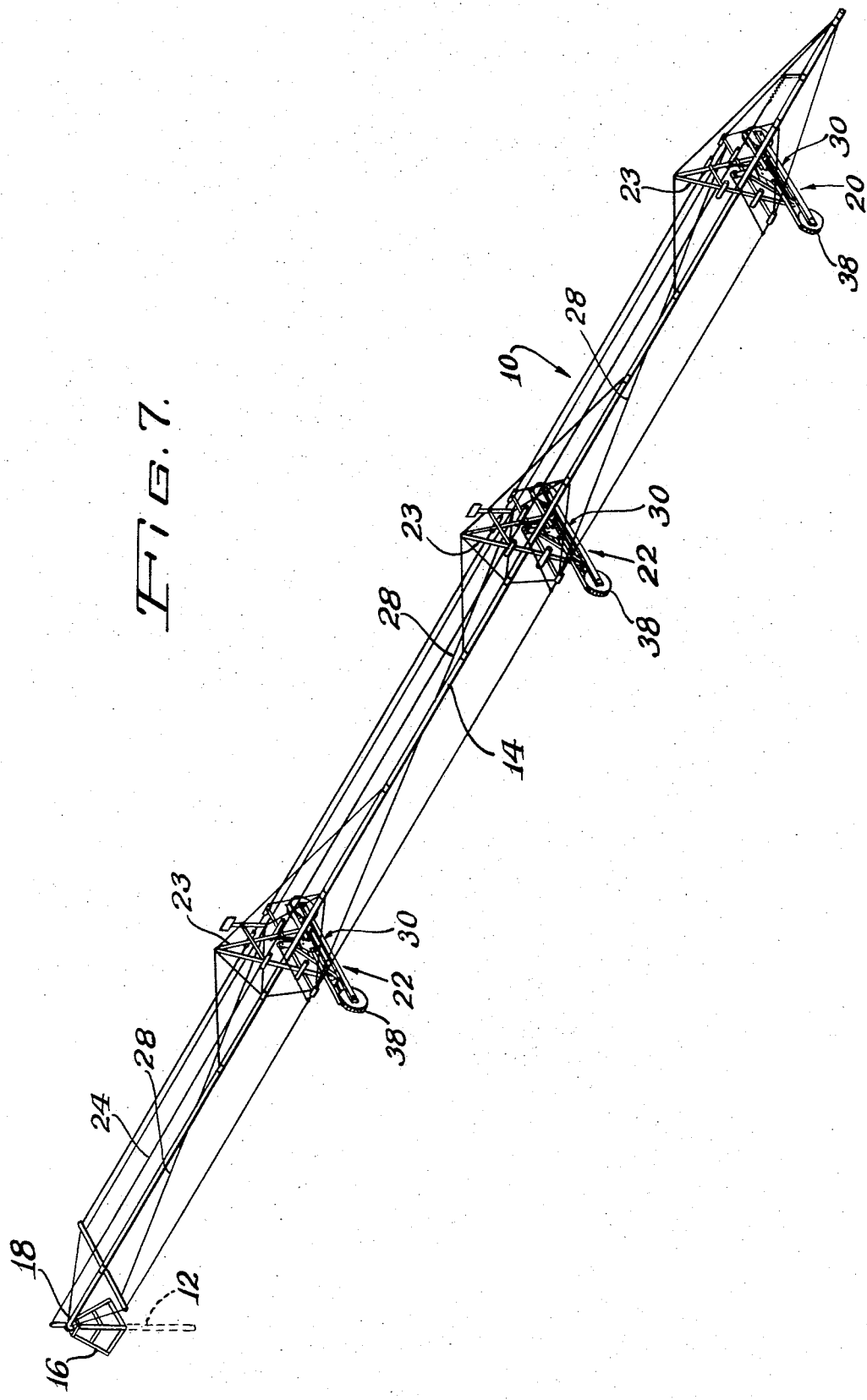

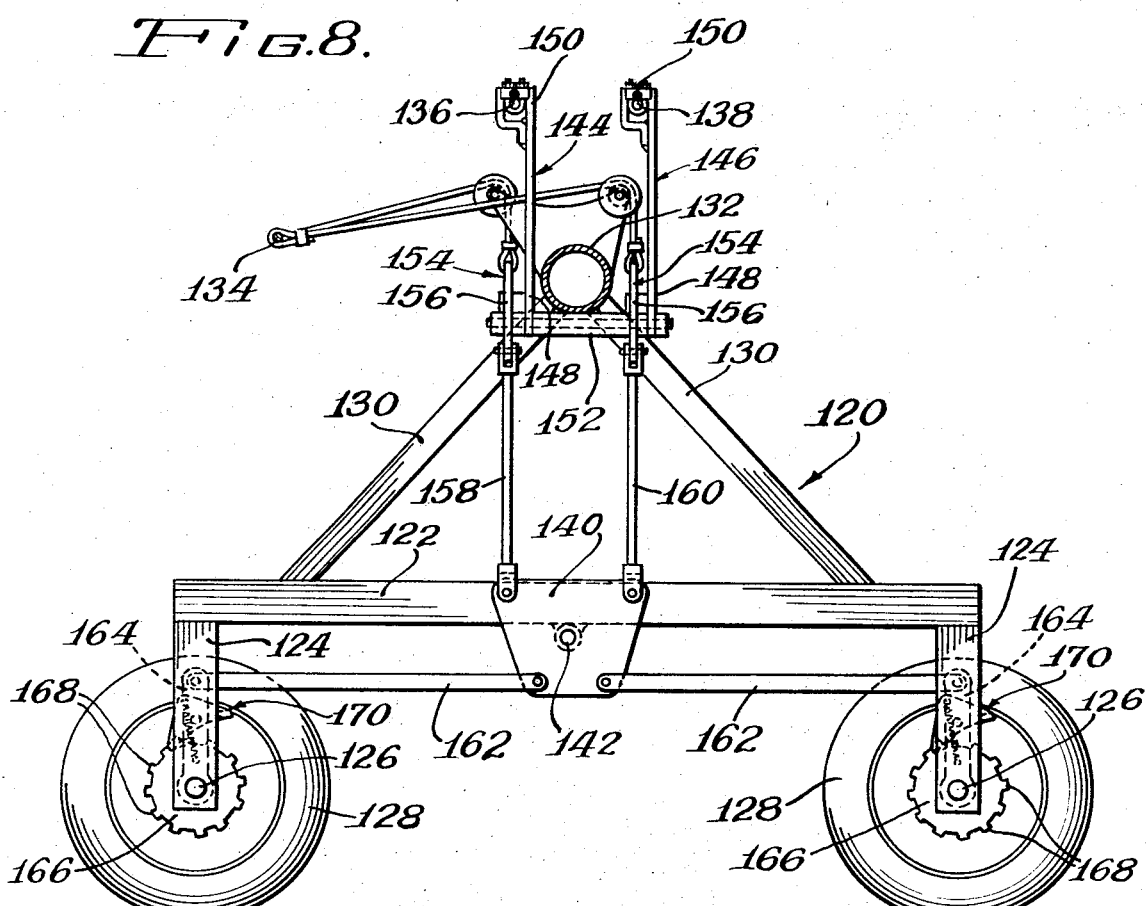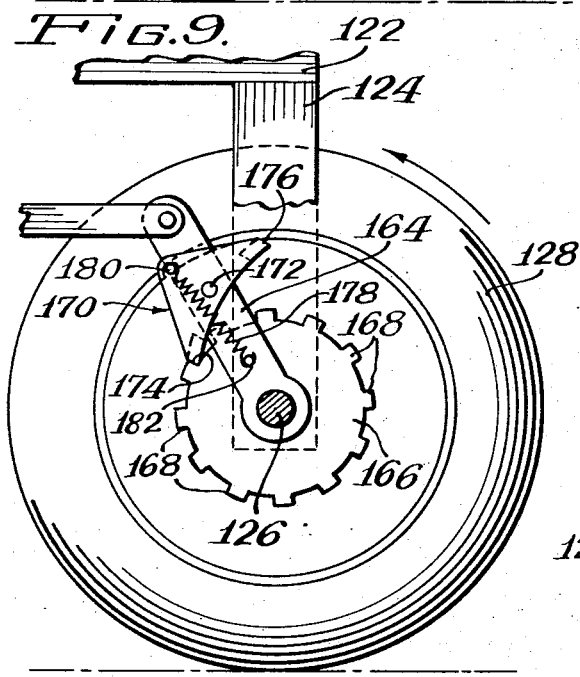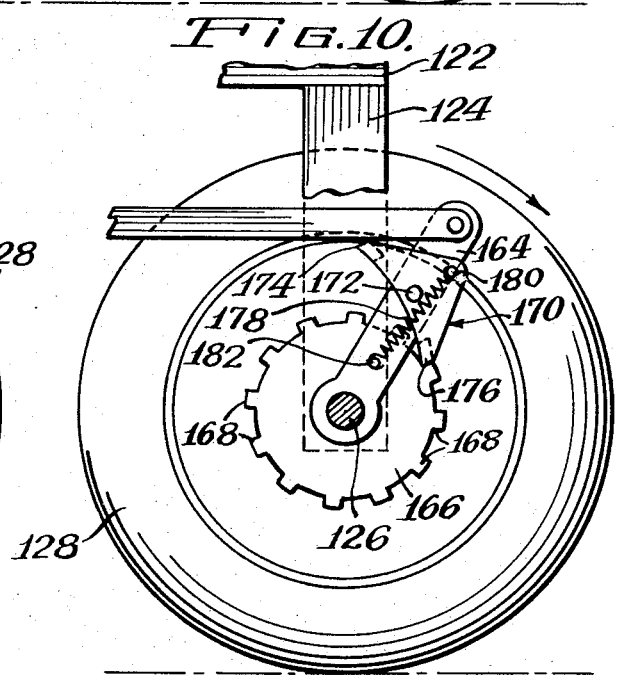

SELF PROPELLED IRRIGATION SYSTEM WITH CLUTCH

BACKGROUND OF THE INVENTION

Field of the Invention and Description of the Prior Art

This invention relates to irrigation systems of the type wherein elongated, above-ground water distribution pipes are pivoted at one end with a pipe being supported along its length by a plurality of spaced, mobile supports, and it particularly relates to the clutch control mechanism by which the pipe is moved.

A common irrigation system used in farming areas comprises an elongated, horizontal water distribution pipe which is rotated at one end above the ground and about a fixed upright axis, at which point the water supply is usually provided. The other end of the pipe is pivoted about the fixed upright axis while the pipe rotates to define a closed path of travel, which is normally circular. These irrigation systems commonly irrigate large areas, as a quarter section or 160 acres. Thus, the water distribution pipes may be as long as 1300 feet or one-quarter of a mile. One problem commonly encountered with these irrigation systems is that the water pipe must be maintained in substantial linear alignment from the pivoted end to the moving end. A plurality of mobile supports are conventionally spaced along the length of the pipe to provide a suitable moving support therefor.

In one type of irrigation system, a reciprocating power cable is used to drive the pipe about the fixed pivot and is commonly driven by water power from the flow of irrigation water coming from the water supply pipe. Such a reciprocating power cable system is shown, for example, in my U.S. Pat. No. 3,373,939. In this system, the mobile supports are movably supported on the ground by a set of ground engaging shoes which are interconnected to legs which are pivoted to the shoes to propel the mobile supports and thereby the water pipe along the ground.

Other moving irrigation systems do not use the propelling shoe arrangement, but rather use wheels which are rotated at a selected speed. One such system is shown in my U.S. Pat. No. 3,353,750. In this system, a reciprocating power cable operates a drive ratchet at the outer support. The drive ratchet, in turn, is operatively connected, by drive chains, to the ground engaging wheels for imparting the desired rotary movement thereto.

In all of these systems, one of the principal problems encountered, as mentioned above, is the maintenance of the alignment of the intermediate mobile supports with the outer main support so that the pipe does not unduly bend at its joints and break a pressure seal or even break the pipe. For this reason, the intermediate mobile supports generally include a control mechanism to maintain the intermediate supports in lateral alignment with each other and also with the outer main driving support.

In my two U.S. patents, two different mechanisms are used in order to bring each intermediate mobile support into alignment with the other supports when the one mobile support lags behind or moves ahead of the other pipe carrying mobile supports. In my U.S. Pat. No. 3,373,939, a control cable and ratchet arrangement is used for the maintenance of alignment between the mobile supports, which are moved by propelling shoes. In my U.S. Pat. No. 3,353,750, a control cable and ratchet of somewhat different construction are used to control the wheel supported mobile supports.

Other well known irrigation systems use a trojan bar arrangement to drive wheels, the power being provided by hydraulic (water power) cylinders which impart driving reciprocal motion to the trojan bar assembly and thereby to the wheels. Although generally no adjusting means is needed to maintain alignment between the mobile supports, the disadvantage of the water power cylinder, trojan bar system is that the construction and/or maintenance costs are considered high. The use of the water power to drive each of the towers wastes up to 200 gallons per minute of water.

The wheel type systems have the distinct advantage of being reversible. If for example, the propelling shoe type system comes up against an obstruction, as a building or a tree, the irrigation assembly cannot be easily moved away from the obstruction. For these reasons, it is considered desirable to provide an irrigation system combining the advantage of a trojan bar-wheel system with a control cable-power cable system, while at the same time avoiding the disadvantages of the water power cylinders used in conventional trojan bar-wheel systems.

SUMMARY OF THE INVENTION

It is therefore an important object of this invention to provide an improved drive mechanism for use in a self-propelled irrigation system of the type using a trojan bar-wheel drive arrangement on each mobile support wherein the drive mechanism includes a clutch mechanism on each support for cooperating with a control cable, and as well as with a power cable, for moving an intermediate mobile support into alignment with other intermediate mobile supports and with the main mobile support.

It is also an object of this invention to provide an improved irrigation system including a trojan bar-wheel drive arrangement, a control cable, and a reciprocating power cable wherein the mechanism includes a clutch on each intermediate mobile support, the clutch being disengaged when one mobile support moves ahead of other supports and is engaged when the mobile support lags behind the other mobile supports.

It is a further object of this invention to provide an improved clutch mechanism for use in combination with a power cable and control cable for connecting and disconnecting the power cable to a trojan bar assembly on each mobile support for rotating the support wheels of an irrigation system wherein the mechanism is characterized by a clutch which responds to the control cable detecting when a particular mobile support lags behind or moves ahead of other mobile supports.

It is yet another object of this invention to provide an improved irrigation system of the type including a trojan bar-wheel drive arrangement wherein the drive mechanism, utilizing a control cable and clutch mechanism, is characterized by economy of construction and economy of operation.

It is still a further object of this invention to provide an irrigation system which includes a trojan bar-wheel drive arrangement, using a control cable and clutch arrangement, wherein the mechanism is constructed and arranged to readily be moved in both forward and reverse directions.

Further purposes and objects of this invention will appear as the specification proceeds.

The foregoing objects are accomplished by providing an irrigation system of the type which includes an elongated, substantially horizontal water distribution pipe and a plurality of spaced mobile support members carrying the pipe, an arm being pivotally supported by each support member, a reciprocal drive cable for pivoting the arm, wheel means being mounted on the mobile supports for providing movable support thereof along the ground, a drive mechanism for rotating the wheels, a connecting rod for imparting pivotal movement from the arm to the drive mechanism for rotating the ground engaging wheels, a control cable having a first condition when one mobile support lags behind other of the support members and having a second condition when the one support member moves ahead of the other support members, and a clutch having an engaged position, when the control cable is at the first condition for transmitting motion from the arm to the drive mechanism, and having a disengaged position when the control cable is at the second position for stopping the transmission of motion from the arm to the wheel drive mechanism.

BRIEF DESCRIPTION OF THE DRAWINGS

A particular embodiment of the present invention is illustrated in the accompanying drawings wherein:

FIG. 1 is a side elevational view of a portion of a mobile support using my improved economical drive mechanism for operating a trojan bar-wheel drive system of a self-propelled irrigation system;

FIG. 2 is an enlarged sectional view taken along the line 2—2 of FIG. 1 illustrating, in detail, the clutch mechanism used for the wheel drive mechanism;

FIG. 3 is an enlarged sectional view of the clutch mechanism taken along the line 3—3 of FIG. 2;

FIG. 7 is an overall, schematic view of the water distribution system of the type utilizing my improved drive and alignment control mechanism therefor;

FIG. 8 is a side elevational view of a mobile support using two of my improved drive mechanisms for operating a trojan-bar wheel drive system of a self propelled irrigation system wherein the mobile support is specifically designed to readily move in both forward and reverse directions;

FIG. 9 is an enlarged side elevational view of one of the wheels shown in FIG. 8, showing the position of a drive pawl for moving the support in one direction; and FIG. 10 is an enlarged side elevational view, similar to FIG. 9, showing the position of the drive pawl for moving the support in a direction opposite that of FIG. 9. For a more detailed explanation of various conventional operating parts of the irrigation system, reference is made to my prior patents, including U.S. Pat. Nos. 3,373,939 and 3,353,750, mentioned above.

Referring to FIGS. 1 and 7, an intermediate mobile support 22 is shown with a rigid "A" shaped support structure 23, for supporting the power cable 24 and the control cable 28. The cable support structure 23 is not considered an important element of the invention herein and therefore will not be described in detail. The intermediate mobile support 22 also includes a lower support frame, generally 30, which includes an A-frame section 32, and a lower, horizontal wheel support beam 34. The A-frame 32 includes a pair of upwardly and inwardly converging legs 36 which are adjacent at their upper ends, and which are rigidly secured, as by welding to the water distribution pipe 14. The spaced lower ends of the legs 36 are secured to the upper ends of the horizontal beam 34, as are the legs of the cable support frame 23.

Figure 4:
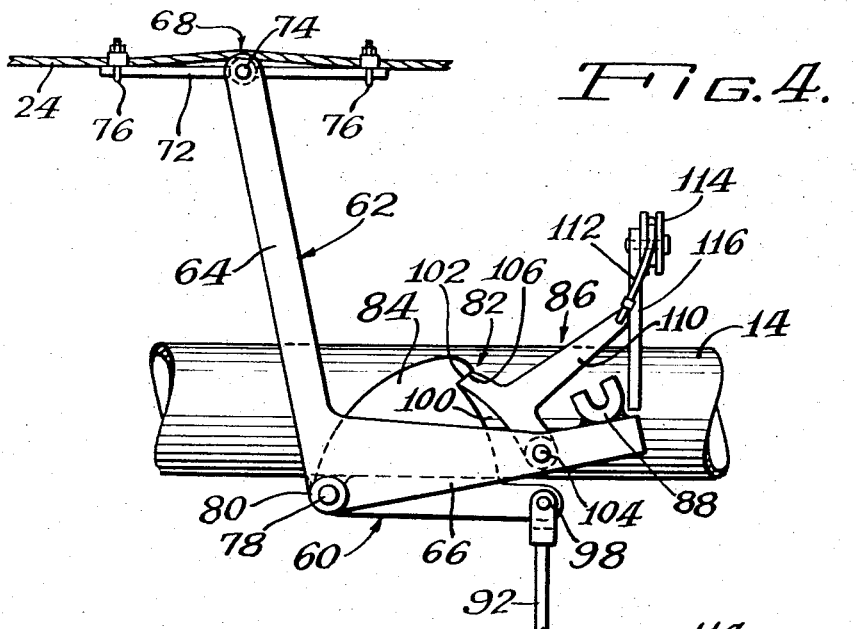
FIG. 4 is a view, similar to FIG. 2, showing the drive mechanism in the operative position and the clutch in the engaged position.

A pair of ground engaging wheels 38 are rotatably supported, in a suitable manner, at the opposite ends of the horizontal beam 34. Each wheel 38 is rotatable about an axle 40 which is substantially parallel to the axis of the water distribution pipe 14.

A pivoted drive plate 42 is pivotally secured to a central support or cross support 44 of the A-frame 32 for pivoting movement in a plane transverse to the longitudinal axis of the irrigation system 10 or water distribution pipe 14. The upper portion of the generally triangular drive plate 42 is pivoted at 46 to the cross support 44 while the outer lower ends of the drive plate 42 are pivotally interconnected to rigid bars or trojan bars 48 of the trojan bar assembly 26 at pivot connections 50.

The outer ends of each of the trojan bars 48 include rigid drive portions or pawls 52. The pawls 52 successively engage a plurality of cleats 54 provided on the outer periphery of each support wheel 38. The cleats 54 also provide improved traction for the wheels 38 as they roll along the ground. Referring to FIG. 1, as the drive plate 42 pivots reciprocally or back and forth, in a manner to be hereinafter described in greater detail, the pawls 52, by engaging the cleats 54, impart drivable rotation to the wheels 38 for rotation in the direction indicated by the arrows in FIG. 1, that is, in a clockwise direction. Each of the pawl portions 52 has an upright driving face 56, and a sloping return face 58 which slides over a trailing cleat 54 as the trojan bar 48 is reciprocated rearwardly.

Referring to FIGS. 2 and 3, in particular, a drive mechanism, generally 60, is operatively interposed between the power or drive cable 24 and the trojan bar drive assembly 48. The drive mechanism 60 includes a generally L-shaped pivot plate, generally 62, which includes an upright leg 64, and a generally transverse arm 66. The upright leg 64 is rigidly interconnected to the power cable 24 by a connecting portion, generally 68. The upper end of the leg 64 includes a rigid bracket 70, which is welded to the leg 64. The connecting element 68 includes an elongated rod 72 which is spaced along and adjacent the power cable 24. A foreshortened transverse bar or rod 74 is welded to the intermediate portion of the rod 72 and is secured to the bracket 70 at the upper end of the leg 64, as shown best in FIG. 3. The elongated rod 72 is positioned in the space between the upright portion of the bracket 70 and the leg 64 and the opposite ends thereof are rigidly secured to the power cable 24, by clamp members 76. The pivot member 62 is pivoted about a pivot rod 78 which is journaled within a bearing 80, welded to the underside of the water distribution pipe 14, as seen in FIG. 3.

A clutch assembly, generally 82, is operatively connected to the pivot member 62. The clutch assembly 82 includes a pivotable clutch plate, generally 84, a pawl member, generally 86, and a permanent magnet 88.

The clutch plate 84 is pivotally carried on the pivot rod 78. The clutch plate 84 includes a laterally extending arm 90 which is pivotally interconnected to a substantially upright rigid power rod 92. As seen in FIG. 1, the lower end of the power rod 92 is pivotally secured to a pivot rod 94 positioned on a laterally extending arm 96 of the pivot member 62. The upper end of the arm 90 is pivoted at a pivot connection 98 to the arm 90 of the clutch plate 84. The clutch plate 84 includes a cut out portion 100 located above the arm 96 of the clutch plate 84. A downwardly facing drive face 102 is defined at the upper end of the cut out portion 100 and acts to operatively engage the pawl 86.

The pawl member 86 is pivotally secured to a pivot rod 104, which is carried to the transverse arm 66 of the clutch plate 62. As seen in FIG. 2, the pawl 86 includes a drive face 106, which engages the drive face 102 of the clutch plate 84. The pawl 86 is generally positioned within the cut out portion 100. The pawl 86 includes an arcuate main body portion 108 which extends between the pivot 98 and the drive face 106. An outwardly extending arm 110 extends from the central portion of the arcuate portion 108. The outer end of the arm 110 receives a flexible connecting cable 112 which is interconnected to the control cable 28, also seen in FIG. 1. The end of the cable 112 is rigidly received within an aperture in the arm 110 and passes over a pulley 114 carried at the outer end of a support arm 116 which is rigidly secured to the upper outer periphery of the water distribution pipe 14.

The permanent magnet 88 is rigidly secured to the outer end of the arm 90 of the clutch plate 84 and is aligned directly below the arm 110 of the pawl member 86. The pawl member 86, when the permanent magnet 88 is being used, must be of a material attractible by the magnet 88, such as a magnetically attractible steel.

Referring to FIG. 8, there is shown a side elevational view of a preferred mobile support, generally 120, which is particularly designed for being readily moved in both forward and reverse directions in a manner to be hereinafter described in detail. The mobile support 120 includes a substantially horizontal cross support 122 and a pair of downwardly extending support legs 124 are rigidly mounted on the opposite ends of the cross support 122. The lower ends of the legs 124 each have a shaft 126 mounted thereon in a direction substantially horizontal and positioned in a direction transverse to the path of travel of the mobile support 120. Each of the support shafts 126 rotatably supports a ground engaging wheel 128.

A pair of upwardly and inwardly converging support arms 130 extend from the cross support 122 and are rigidly secured to the water distribution pipe 132, which is positioned substantially transverse to the length of the mobile support 120 and cross support 122.

As with the embodiment of FIGS. 1–7, a control cable 134 for detecting when the mobile support 120 moves ahead of or lags behind other mobile supports (not shown), is provided. In the embodiment of FIGS. 8–10, although one contral cable 134 is used, two power cables 136 and 138 are used in order to move the mobile support 120 in both forward and reverse directions. A rocker plate 140 is pivotally mounted about a pivot shaft 142, securely positioned at the central, lower side of the cross support 122.

In the embodiment of FIG. 8, a pair of drive mechanisms 144 and 146 are operatively interconnected between the power cables 136 and 138 respectively and the rocker plate 140. Both drive mechanisms 144 and 146 are similarly constructed, and include components which correspond to the single drive mechanism 60 of the embodiment of FIGS. 1–7.

Referring to FIG. 8, the drive mechanisms 144 and 146 each include a pivot plate 148, which is securely fastened, by a clamping assembly 150 at its upper ends, to the lower cables 136 and 138, respectively. The pivot plate 148 is pivoted about a pivot rod which is journaled within a bearing 152. A clutch assembly 154 is provided for each of the drive mechanisms 144 and 146 and is constructed in a manner similar to the clutch assembly 82 of the embodiment of FIGS. 1–7. The clutch assembly 154 includes a clutch plate 156. The drive mechanism 144 has its clutch plate 156 pivotally interconnected to a power rod 158, while the drive mechanism 146 has its clutch plate 156 pivotally interconnected to a power rod 160. The power rods 158 and 160 are pivotally interconnected to opposite, upper corners of the rocker plate 140.

A pair of oppositely projecting, horizontal drive bars 162 are pivotally interconnected to the opposite, lower corners of the rocker plate 140. The opposite outer ends of the drive bars 162 are pivotally interconnected to the upper ends of pivot arms 164 which are pivotally carried, at their lower ends, to the wheel shafts 126.

A generally circular ratchet plate or wheel 166 is non-rotatably secured to the planar upright outer face of each of the ground engaging wheels 128. Each ratchet wheel 166 includes a plurality of circumferentially spaced substantially square ratchet teeth 168.

Each of the pivot arms 164 has an adjustable drive pawl 170 pivotally mounted on a rigid pivot member 172 which is mounted intermediate the shaft 126 and the pivot connection with one of the drive bars 162. The pawl member 170 is adjustable between two positions, as seen in FIGS. 9 and 10, for rotating the ground engaging wheels 128 in opposite directions, that is, in the counterclockwise direction, as viewed in FIG. 9, and in the clockwise direction, as viewed in FIG. 10. Each pawl member 170 is pivotally secured at its central portion and includes a driving face 174 and an opposite driving face 176.

In order to cause the desired driving face 174 or 176 to positively and drivably engage the teeth 168 of the ratchet wheel 166, an over-the-center tension spring 178 is interconnected between a connecting pin 180 on the pawl 170, generally above the pivot 172, while the lower end of the tension spring 178 is mounted on a pin 182 which is positioned intermediate the pivot member 172 and the wheel shaft 126, on the pivot arm 164.

As seen in FIG. 9, when it is desired to rotate the wheel 128 in a counterclockwise direction, the pawl 170 is rotated about the pivot member 172 so that the driving face 174 engages a tooth 168 of the ratchet wheel 166, as the spring 178 holds the pawl 170 in the driving position. Alternatively, when it is desired to rotate the wheels 128 in the opposite or clockwise direction, the pawl 170 is again pivoted about the pivot 172 to the position shown in FIG. 10, with the driving face 176 operating against one of the teeth 168 of the ratchet wheel 166.

The operation of the mechanism, particularly the clutch assembly 82 is best seen by referring to FIGS.

2–6. When one of the intermediate mobile supports 22 has lagged behind other intermediate supports 22 and/or the outer support 20, the control cable 28 becomes taut, which is conventional in control cable systems. When this occurs, the flexible cable 112, interconnected to the pawl 86, is also pulled tight and this pivots the pawl 86 upwardly and away from the magnetic force of the permanent magnet 88, as seen in FIGS. 2 and 4. The driving face 106 of the pawl 86 thereby bears against the drive face 102 of the clutch plate 84. Since the power cable 24 reciprocates back and forth, as viewed in FIGS. 2 and 4, the pivot member 62 is rocked about the rod 78. Since the pawl 86 is pivotally secured at 98 to the arm 66 of the pivot member 62, and since the driving faces 102 and 106 are engaged, the rocking motion of the pivot member 62 is directly imparted to the clutch plate 84.

In FIG. 2, the mechanism is shown when the leg 64 of the pivot member 62 is in a generally upright position and the arm 66 is generally horizontal. When the power cable 24 is reciprocated to the left, as viewed in FIGS. 2 and 4, the leg 64 pivots counterclockwise to the position shown in FIG. 4, lifting the clutch plate 84, as the pawl 86 acts against the clutch plate 84. When the clutch plate is pivoted, the rod 92 is lifted. Reciprocal motion of the power rod pivots the drive plate 42, ultimately causing the trojan bars 48 to reciprocate back and forth so as to rotate the wheels 38 as the pawl portions 52 operatively and drivably act against the cleats 54 of the wheels 38.

When the intermediate support 22 "catches up" to the other supports 22, or moves ahead of the supports 22, the control cable 28 becomes loose. When this occurs, the flexible cable 112 also becomes loose, the magnet 88 attracts the clutch plate 84 and causes its driving face 106 to move away from the driving face 102 of the clutch plate 84.

Figure 5:
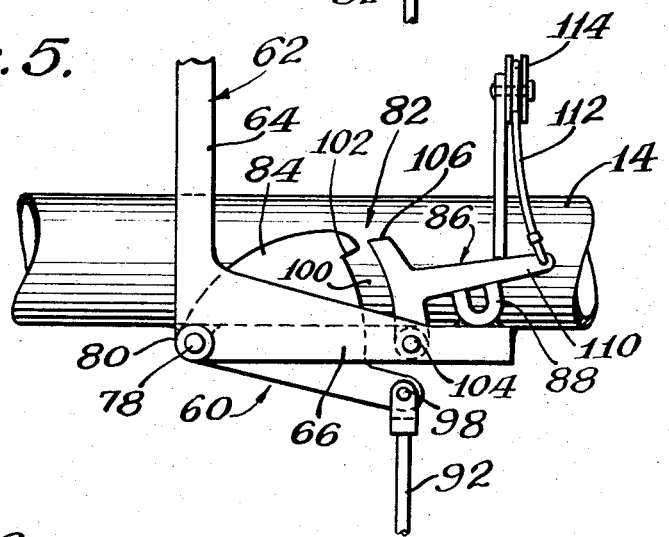
FIG. 5 is a view similar to FIGS. 2 and 4, but showing the drive mechanism in the inoperative position and the clutch in the disengaged condition.
Figure 6:
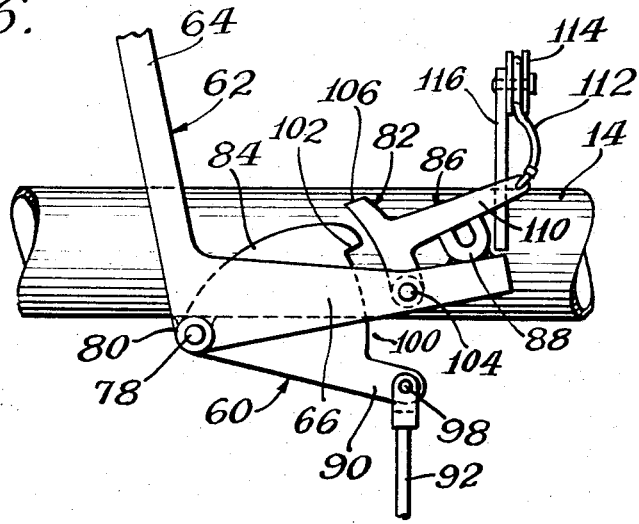
FIG. 6 is a view similar to FIG. 5 showing the clutch mechanism disengaged and while the pivot arm is still being moved by the reciprocal drive cable.

As seen in FIGS. 5 and 6, the clutch plate 84 is then free of the pawl 86. When this occurs, although the power cable 24 continues reciprocating back and forth, and although the pivot member 62 keeps pivotally reciprocating, as from the position of FIG. 6 and back again, the clutch plate 84 is not reciprocated, because there is no driving connection between the pivot member 62 and the clutch plate 84, the pawl 86 being free of the clutch plate 84. Since the clutch plate 84 is not reciprocated, no movement is imparted to the drive plate 42 or to the trojan bars 48 or to the wheels.

Referring to FIG. 8, the clutch assembly 154 operates the same way for both the drive mechanisms 144 and 146. It has been found that two separate drive mechanisms 144 and 146, operating with two separate power cables 136 and 138, are particularly effective in operating or moving the mobile support 120 in both forward and reverse directions. When one of the drive mechanisms 144 is operated by the power cable, as the power cable 136, the other drive mechanism 146 is basically inoperative, or "goes along for the ride."

As previously described, when the pawls 170 are pivoted about the pivot point 172, the operating direction of the wheels 128 changes because the driving action of the pawls is changed. As the rocker plate 140 is reciprocally pivoted about the pivot 142, the drive bars 162 reciprocate back and forth and rotate the connecting arms or pivot arms 164. As the arms 164 rock back and forth or pivot about the shafts 126, the driving faces 174, in the position of FIG. 9, operate against the teeth 168 of the ratchet wheel 166 to drive the wheels 128 in the counterclockwise direction, as viewed in FIG. 9. Alternatively, when it is desired to rotate the wheels 128 in the opposite direction, the pawl 170 is pivoted in the opposite direction about the pivot member 172 so that the driving face 176 engages the ratchet teeth 168 and rotates the ratchet wheel 166 and thereby the wheels 128 in the opposite direction, that is, in the clockwise direction, as viewed in FIG. 10.

From the foregoing, it is apparent that I have provided a highly simple and yet effective construction for an irrigation system wherein mobile support 22 is brought into line with other mobile supports, regardless of whether the support 22 lags behind or moves ahead of the other supports. The construction is economical, and it does not utilize hydraulic cylinders using water power for moving the wheels, but rather uses a simple and economically constructed power cable and control cable system of the type used, for example, with propelling shoes.

While in the foregoing, there has been provided a detailed description of particular embodiments of the present invention, it is to be understood that all equivalents obvious to those having skill in the art are to be included within the scope of the invention as claimed.

What I claim and desire to secure by Letters Patent is:

1. In an irrigation system of the type which includes an elongated, substantially horizontal water distribution pipe, and a plurality of laterally spaced aligned support means for said pipe, the improvement comprising, in combination, an arm supported by said support means, a reciprocal drive cable for moving said arm, wheels mounted on said support means for movement of said support means and said pipe along the ground, a drive mechanism for rotating said wheels, a connecting member for imparting the movement of said arm to said drive mechanism for rotation of said wheels, a control cable having a first condition when said support means lags behind other support means and having a second condition when said support means moves ahead of other support means, and clutch means having an engaged position when said control cable is at said first condition, for transmitting motion from said arm to said drive mechanism, and having a disengaged position when said control cable is at said second condition for stopping the transmission of motion from said arm to said drive mechanism.

2. The apparatus of claim 1 wherein said arm is reciprocally and pivotally mounted on said support means, said wheel drive mechanism includes trojan bars for imparting rotation to said wheels and a pivot member pivotally mounted on said support means, and said connecting member comprises a rigid member interconnecting said pivot member to said arm for imparting the movement of said arm to said trojan bars and thereby to said wheels.

3. The apparatus of claim 1 wherein said drive mechanism for said wheels comprises a trojan bar assembly, said wheels being transversely positioned relative to the longitudinal axis of said water distribution pipe and said trojan bars impart incremental rotational movement to said wheels.

4. The mechanism of claim 1 wherein said first condition of said control cable comprises a tightened condition, said second condition of said control cable comprises a loose condition, and said clutch means includes a clutch plate and a pawl member being interconnected to said control cable, said pawl member and said clutch plate being in said engaged position when said cable is tight and in said disengaged position when said control cable is loose.

5. The mechanism of claim 4 wherein said clutch arm is of a magnetible attractible material and said clutch means includes a magnet mounted on said arm, said magnet attracting said pawl member when said control cable is in the loose condition for disengaging said clutch means and said clutch arm being pulled away from said magnet when said control cable is tightened.

6. The apparatus of claim 1 wherein said clutch means comprises a clutch plate interconnected to said connecting member, a pawl member pivotally mounted on said arm, and a magnet mounted on said arm for attracting said pawl member, said pawl member being interconnected to said control cable, said pawl member engaging said clutch member for imparting movement to said connecting member when said control cable is in said first condition and said pawl member being attracted away from said clutch member by said magnet when said control cable is in said second condition.

7. The apparatus of claim 6 wherein said first condition of said control cable is tight and said second condition of said control cable is loose.

8. The apparatus of claim 1 wherein said drive cable reciprocates said arm at all times, while transmitting motion of said arm to said connecting member to said drive mechanism and thereby to said wheels, only when said clutch means is in said engaged position and only when said control cable is in said first condition.

9. The apparatus of claim 1 including means for rotating said wheels in both forward and reverse directions.

10. The apparatus of claim 1 including a pair of arms supported by said support means, a separate reciprocal drive cable for moving each of said arms, and separate clutch means interconnected to said control cable for transmitting motion to a selected one of said arms so that said wheels rotate, selectively, in either the forward or reverse direction.

11. The mechanism of claim 10 including a ratchet member rigidly interconnected to each wheel, and a drive pawl mounted on said drive mechanism for driving said ratchet member and thereby said wheels in the desired direction.

12. The mechanism of claim 11 wherein said pawl is movable between a first position and rotating said wheels in one direction, and a second position for rotating said wheels in the opposite direction.

* * * * *